May 9, 1967
A. G. DENMAN
3,318,041
CORD OPERATED HUMMING REEL
Filed May 11, 1964
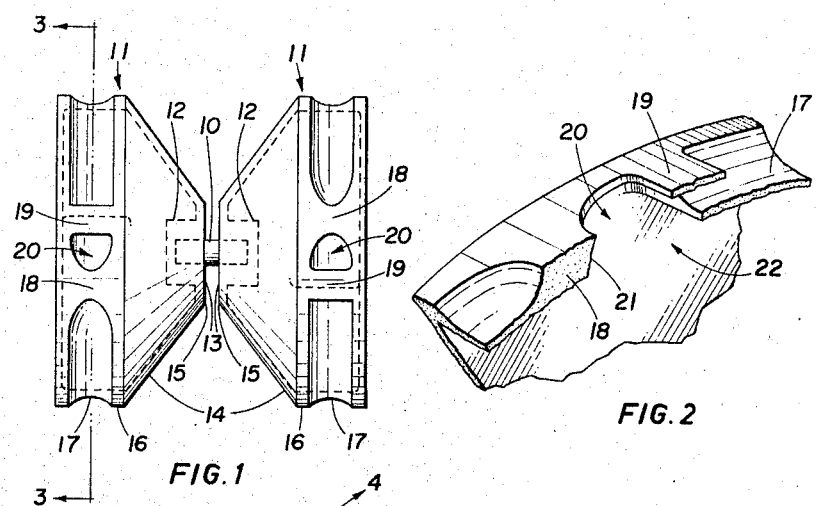
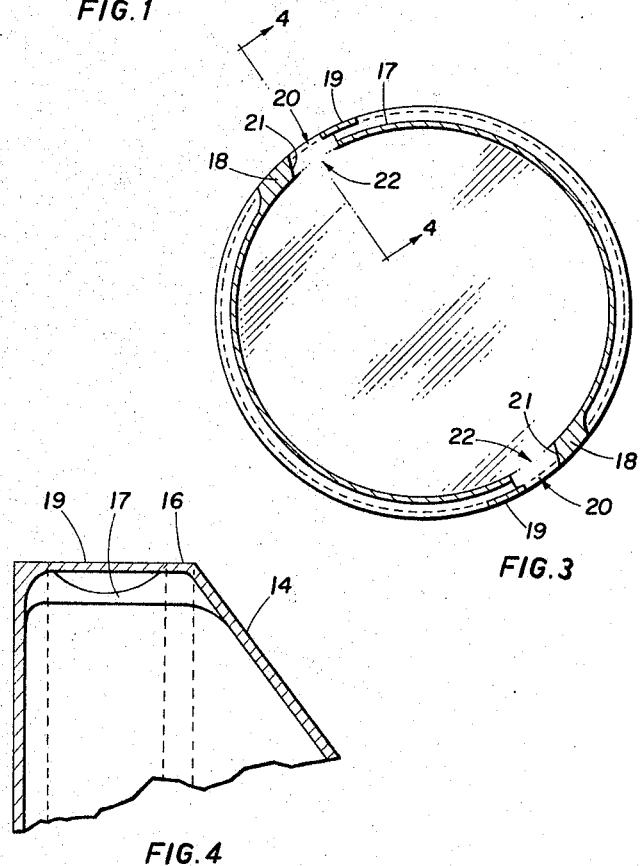
Inventor
ARTHUR GEORGE DENMAN
by: *Cavanagh & Norman*

United States Patent Office 3,318,041
Patented May 9, 1967

3,318,041
CORD OPERATED HUMMING REEL
Arthur George Denman, 2503 12th Ave. SW.,
Calgary, Alberta, Canada
Filed May 11, 1964, Ser. No. 366,391
1 Claim. (Cl. 46—60)

The invention relates to an improved cord operated humming reel and is an improvement of my humming reel as disclosed in Canadian Letters Patent 646,546 granted to me on Aug. 14, 1962.

So called conical spinning toys are well known but the conical walls thereof terminate adjacent one another thus making it extremely difficult to manipulate same upon a cord.

Furthermore, the conical walls of such conventional reels are relatively shallow once again making it difficult for the operator to manipulate same.

By providing a central spindle and a pair of opposed conical wall body portions, having vertical opposed faces adjacent the spindle, I facilitate the maneuverability of the device and by making the conical walls relatively steep, I make same easier to operate.

In addition, the conical walls of my aforesaid humming toy are hollowed out and provided with peripheral apertures to produce a humming noise when the toy is operated.

The principal objective of the present invention is to provide an improved humming toy wherein the characteristics and tone of the humming note produced are improved, and wherein the development of the humming note is achieved at a relatively lower rotational speed thus rendering the toy easier to operate by children or novices.

A preferred embodiment of the invention will now be described with reference to the following drawings in which like reference numerals refer to like parts thereof throughout the various views and diagrams and in which:

FIGURE 1 is a front elevational view of the present invention showing the interior contours in phantom, FIGURE 2 is a perspective cutaway view of a detail of FIGURE 1, FIGURE 3 is a section along the line III—III of FIGURE 1, and FIGURE 4 is a section along the line IV—IV of FIGURE 3.

From FIGURE 1 it will be seen that the present invention comprises the cylindrical spindle 10 and two body portions 11 on each end thereof. Each of said body portions is preferably hollow and consists of a central core 12 by which the body portions are secured to the opposite ends of spindle 10. These cores 12 present a substantially circular inner face 13 which, when mounted upon the spindle, extend at right angles to the longitudinal axis thereof.

Conical walls 14 extend from the peripheries 15 of the inner faces 13 and terminate in outer walls 16, which lie substantially parallel to the longitudinal axis of the spindle 10. Annular grooves or troughs 17 extend around substantially the entire periphery of outer walls 16, being interrupted only by the raised portion or barriers 18. Bridge portions 19 extend across grooves 17, and, together with the thickened portional barriers 18 define outer generally beehive shaped apertures 20, the apexes of respective apertures 20 being directed in opposite directions as shown in FIGURE 1. Immediately below and in registration with apertures 20, troughs 17 are cut away to define, together with the opposed faces 21 of thickened portions 18, interior apertures 22. It will be noted that bridges 19 partially overlie interior apertures 22, and further that faces 21 of thickened portions 18 are flared inwardly so as to provide interior apertures 22 of greater cross-sectional area than exterior apertures 20.

End walls 23 enclose the hollow interiors of the respective main bodies 11.

In operation a cord or string (not shown) is wound around the spindle and the opposite ends of the cord are held in the hands of the operator or attatched to sticks held in the hands of the operator. The cords are then moved alternately up and down thus rotating the toy rapidly. In this way air will pass around troughs 17 and into apertures 20 and 22 causing a characteristic humming note which can be raised or lowered in tone by increasing or reducing the speed of rotation. Obviously, the toy can also be operated by throwing the reel into the air and catching it again on the cord and various other forms of operation will become apparent.

The foregoing is a description of the preferred embodiment of the invention which is here made by way of example only. The invention is not to be taken as limited to any of the specific features as disclosed, but comprehends all such variations that come within the spirit and scope of the appended claim.

What I claim is:

A reel adapted to be rotated by a cord manipulated by an operator and comprising in combination, a central spindle, a pair of substantially circular hollow body portions secured in opposition on each end of said spindle, each of said body portions comprising an inner circular face portion situated normal to the axis of said spindle, an inclined conical wall portion extending outwardly from the perimeter of said face portion, on outer cylindrical wall portion, the axis of said cylinder being located in a plane substantially parallel with longitudinal axis of said spindle, an outer face enclosing the hollow interior of said hollow body portions, at least one annular trough extending around substantially the entire periphery of said cylindrical wall portion; barrier means extending across said trough; a bridge member extending over said trough adjacent to said barrier means, and defining therewith an opening therebetween, and an aperture formed in said trough beneath said bridge member giving access to said hollow interior.

References Cited by the Examiner
UNITED STATES PATENTS
3,076,287  2/1963  Jermyn _____ 46—60
FOREIGN PATENTS
646,546  8/1962  Canada.

RICHARD C. PINKHAM, Primary Examiner,
DELBERT B. LOWE, Examiner.
R. F. CUTTING, Assistant Examiner,